July 20, 1937.  A. F. HICKMAN  2,087,255
VEHICLE SPRING SUSPENSION
Filed Nov. 6, 1933    8 Sheets-Sheet 2

INVENTOR
Albert F. Hickman
BY
Popp & Powers
ATTORNEYS

July 20, 1937.  A. F. HICKMAN  2,087,255
VEHICLE SPRING SUSPENSION
Filed Nov. 6, 1933   8 Sheets-Sheet 5

INVENTOR
Albert F. Hickman
BY
Popp & Powers
ATTORNEYS

July 20, 1937.  A. F. HICKMAN  2,087,255
VEHICLE SPRING SUSPENSION
Filed Nov. 6, 1933  8 Sheets-Sheet 7

INVENTOR
Albert F. Hickman
BY
Popp & Powers
ATTORNEYS

Patented July 20, 1937

2,087,255

UNITED STATES PATENT OFFICE 2,087,255

VEHICLE SPRING SUSPENSION

Albert F. Hickman, Eden, N. Y., assignor to Hickman Pneumatic Seat Company, Inc., Eden, N. Y., a corporation of New York Application November 6, 1933, Serial No. 696,803

7 Claims. (Cl. 280—124)

This invention relates to a vehicle spring suspension for automobiles and the like, and more particularly to a three-axle (six wheel) vehicle spring suspension having the "non-bottoming" and "non-side sway" characteristics disclosed in my U. S. Patent No. 1,892,305.

The principal objects of the present invention are: A. To permit the main frame of the vehicle to twist and weave without distorting either the alignment of or the distance between the crank shaft bearings which are directly connected with said frame. B. To provide an improved means of absorbing the brake torque of the third axle wheels. C. To positively prevent locking of the operating parts at a past-dead-center position. D. To positively insure accurate alignment of the crank shaft roller bearings under all operating conditions. E. To prevent the traction adjustment from being accidentally altered after having been set in any certain desired position. F. To provide an improved means of distributing stress on the main springs as a consequence of the brake torque imposed thereon by the drive axle wheels. G. To absorb the periodic vibrations in the vehicle spring suspension. H. To prevent twisting strains from being imposed upon the main spring when the drive axle moves otherwise than in a direction parallel to the main chassis frame. I. To simplify the shackle connections between the main spring and the equalizer member. J. To prevent the spherical crank shaft bearings from being subjected to wear as a consequence of purely rotative forces, by preventing them from functioning except when the axis of the crank shaft shifts. K. To enable the spherical bearings to be oil and dust tight under all conditions. L. To reduce both the initial and the replacement cost of the particular parts which limit excessive side movement of the rear ends of the main springs.

Numerous other objects of the invention and practical solutions thereof are disclosed in the herein patent specification, wherein, in the accompanying drawings.

Similar characters of reference indicate like parts in the several figures of the drawings.

This application is a continuation in part of my patent application for Vehicle spring suspension Ser. No. 572,549 filed Nov. 2, 1931 now Patent No. 2,031,482 issued Feb. 18, 1936 and of my patent for Vehicle spring suspension No. 1,934,670 issued on Nov. 7, 1933.

*Heavy vehicle type of construction, Figs. 1–12*

The main or chassis frame of the vehicle is principally constituted of a pair of chassis frame bars 30. These frame bars are transversely tied together by a plurality of cross members in the usual and well-known manner, not deemed necessary here to be shown. Arranged parallel to and outside of said chassis frame bars 30 are a pair of main leaf springs 31, each of which is connected at its forward end by a ball and socket joint 32 to the upper end of a companion spring shackle 33. The latter in turn is pivoted at its lower end at 34 to its companion chassis frame bar 30. To the central parts of said main springs 31 is secured the usual transverse driving axle 35 by means of suitable clip bolts 36 or by any other suitable means. In this particular construction the thrust of said driving axle 35 is taken care of by a pair of suitable radius rods 37, while the power for rotating said drive shaft 35 is supplied through a conventional drive shaft 38. Each end of the drive shaft 35 is provided with the usual drive wheels 40.

The front end only of each of these main springs 31 is supplied with a clip 41, the clip bolt 42 of which bears against the upper, central, dished face of a resilient straddle plate 43. This clip and straddle plate have two distinct functions, one of which is to distribute the force caused by driving shaft brake torque to a considerable number of these spring leaves (this brake torque is counter-clockwise as viewed in Fig. 1). The other function of said clip and straddle plate is to impose a certain frictional resistance to spring flexure so as to rapidly damp out periodic vibrations in the spring structure as a whole.

Connected by a ball and socket joint 44 to the rear end of each main spring 31 is a main shackle 45. The lower end of each of these shackles is pivoted at 46 to the swivel head 47, shown in Figs. 8, 9 and 1. This swivel head is provided at its upper part with a longitudinal cylindrical portion 48 which is received within a semi-cylindrical bore 50 formed at the front lower portion of the equalizing member 51. This arrangement constitutes, in effect, a ball and socket joint between the lower end of the main shackle 45 and the front end of the equalizing member 51.

For the purpose of adjusting the relative loads carried by and hence the proportion of traction between the driving wheels 40 and the third axle wheels 52 (hereinafter to be described), means are provided for adjustably and longitudinally moving the swivel head 47 relatively to the equalizing member 51. This adjustable movement of said swivel head 47 is effected in this heavy vehicle type of construction of Figs. 1–12 by a traction-adjusting screw 53, (Figs. 8, 9, 10 and 1). This traction-adjusting screw 53 is prevented from moving axially forward by reason of a screw plug 54 which is screwed into the front end of the semi-cylindrical bore 50 of the equalizing member 51. Axial rearward movement of said traction-adjusting screw 53 is prevented by a flange 55 formed integrally thereon and bearing against the front face of a suitable lug 56 projecting downwardly and integrally from aforesaid equalizing member 51.

Adjustable rotation of said traction-adjusting screw 53 is rendered possible by having it of rectangular cross section at its rear end so as to enable it to be turned by a wrench. The threaded periphery of said traction adjusting screw engages with a suitable internal thread formed in the swivel head 47, so that, as said adjusting screw is turned in the one or other direction, said swivel head is caused to move longitudinally either forward or backward as may be desired.

One of the novel features in the present invention is to prevent accidental rotation of this traction adjusting screw 53. In the heavy vehicle type of construction of Figs. 1–12, this is effected by a locking dog 57, shown in Figs. 9, 10 and 1. The lower end of said locking dog is crooked and of suitable rectangular configuration to enable it to snugly embrace the rear squared end of the traction-adjusting screw 53. Said locking dog 57 is resiliently urged upwardly by a suitable compression spring 58 which rests upon the upper face of a laterally projecting flange 59 of the equalizing member 51 and is suitably connected at its upper end by means of a washer 60 and pin 61 with the upper end or shank of said locking dog. When the operator desires to rotate the traction-adjusting screw 53 so as to change the traction ratio between the driving and third axle wheels, he first pushes down said locking dog 57 against the resilient resistance of its compression spring 58 and then gives said locking dog a half turn so as to swing its lower end completely clear of the traction-adjusting screw 53. This permits the operator to conveniently apply a suitable wrench to the rear end of said traction-adjusting screw, without being interfered with by said locking dog 57. When a suitable adjustment of said traction adjusting screw 53 has been effected, the operator again pushes down said locking dog 57, gives the same a half turn, and then releases the tension he has been imposing upon the spring 58, thereby enabling the locking dog to resiliently return to the position shown in the drawings.

The central part of the equalizing member 51 is pivoted to the crank pin 62 of the crank shaft 63. The purpose of this crank shaft is described in detail in my Patents No. 1,892,305 and 1,934,670. The rear end of said equalizing member 51 is connected by a ball and socket joint 64 with the third axle 65, the latter carrying, at its outer ends, the conventional third axle wheels 52.

The crank shaft 63 is journaled at its opposite ends by roller bearings 66 in a pair of spherical bearing heads 67. The periphery of each spherical bearing head is of spherical shape and is received within the spherical bore of a spherical bearing 68. This spherical bearing is suitably secured to the lower face of a bracket 70, which latter in turn is suitably secured to the chassis frame bars 30 by suitable bolts 71 or otherwise. Thus it will be seen that the crank shaft 63 is free to rotate in the roller bearings 66 relatively to the spherical bearing head 67, and that the latter, together with its crank shaft 63, is free to oscillate in any direction with respect to the chassis frame bars 30.

It has been found highly desirable to maintain an accurate axial alignment between the crank shaft 63 and the spherical bearing heads 67 so as to avoid any crowding at the one or other end of either of the roller bearings 66. In the present invention this has been effected as follows:—

Secured by suitable bolts 72 or otherwise to the inner face of each spherical bearing head 67 is a centering collar 73 extending a considerable distance inwardly beyond said spherical bearing head and having a relatively close, running fit upon the periphery of the crank shaft 63. Thus, when said crank shaft is oscillated relatively to the spherical bearing 68, such a movement is immediately imparted through said centering collar 73 to the spherical bearing head 67, thereby maintaining the latter in positive axial alignment with the crank shaft 63 and insuring free action of the roller bearing 66 under any and all operating conditions. Leakage of oil toward the center of the vehicle from within the race of the roller bearing 66 is prevented by a suitable packing ring 74, while leakage outwardly from said roller bearing 66 is prevented by a similar packing ring 75. Both of the races of the roller bearing 66 are constituted of sleeves which are constructed of hardened and ground steel. No such provision, however, has been found necessary with respect to the spherical bearing 68, inasmuch as the total amount of movement of the spherical bearing head 67 relatively to said spherical bearing 68 is very small, such a movement only occurring when the chassis frame of the vehicle is distorted.

It has been found, in actual practice, impracticable to entirely prevent the weaving and twisting of the channel frame bars of the ordinary vehicle having a rectangular frame supported at the four corners. The problem therefore has resolved itself in the present instance into permitting such frame weaving without either throwing the crank shaft bearings 66 out of alignment relatively to each other or allowing them to move toward and from each other. In the present invention this problem has been solved (for the heavy vehicle type of construction) by means of a laminated cross beam 76. The latter prevents the chassis frame bars 30 or their brackets 70 from moving relatively to each other in a vertical, transverse plane, but permits any other movement of said bars and brackets relatively to each other. For instance, one of said chassis frame bars 30 may move lengthwise or forward relatively to its companion chassis frame bar without affecting the crank shaft bearings 66. Furthermore, one of said chassis frame bars may move up at one end and down at the other end without any corresponding movement on the part of the other chassis frame bar, and without at the same time permitting the spherical bearing heads 67 to move either toward each other or be moved out of alignment with each other. But if either one of said chassis frame bars 30 starts to rotate about a horizontal, longitudinal axis, this immediately causes the other chassis frame bar to rotate a similar amount (as measured angularly in radians) about the identically same axis. These results all flow from the fact that each lamination of the laminated cross beam 76 is made of a resilient bar of rectangular cross section (see Fig. 11), the vertical dimension or width (major axis) of each bar being considerably greater than its longitudinal dimension or thickness (minor axis). This action is similar to that of an ordinary piece of card-board, which can be readily twisted or bent in any plane except in its own plane.

Figures 7, 8, 9, 10, 11, 12:
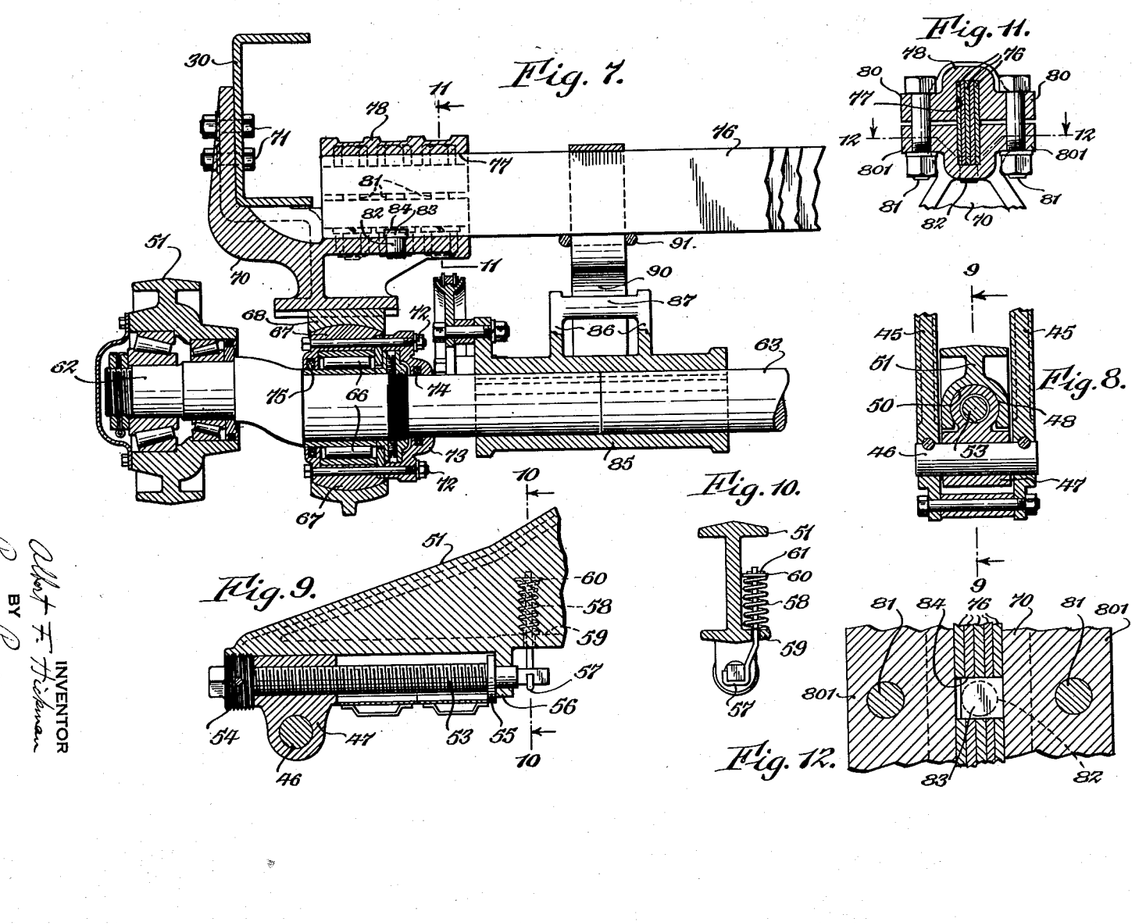
Figure 8 is a fragmentary and substantially vertical section through the lower end of the main shackle, taken on line 8—8 Fig. 1.
Figure 9 is a fragmentary, vertical, longitudinal section through the front end of the equalizer member, taken on line 9—9 Fig. 8.
Figure 10 is a vertical, transverse section through said equalizer member, taken on line 10—10 Fig. 9.
Figure 11 is a fragmentary, vertical, longitudinal section, taken on line 11—11 Fig. 7.
Figure 12 is a considerably enlarged, fragmentary, horizontal section, taken on line 12—12 Fig. 11.

To permit large production tolerances in the manufacture of these laminated cross beams 76 and their immediately associated parts, the same are clamped to the brackets 70 in a novel manner which has proven highly successful in actual practice. As shown in Figs. 11 and 7 the lower edges of each end of said laminated cross beam 76 are received within a horizontal, transverse, rectangular slot 77, which in actual manufacture has such a dimensional tolerance as to, in some cases, cause it to be considerably wider than the overall width of said cross beam 76. This factor, however, does not prevent an absolutely rigid connection being effected between each end of said cross beam 76 and its companion bracket 70. A suitable cap 78 is provided at each end of said cross beam 76, its slotted contact with said cross beam being substantially the same as the slotted contact of each bracket 70 with said cross beam. Each cap 78 and the adjacent portion of its companion bracket 70 is provided with the ears 80—80 and 801—801, respectively, through which pass clamping bolts 81—81. As these bolts are tightened, the portion of metal of each cap and its companion bracket which is immediately adjacent the medial part of the companion end of the cross beam 76 is forced inwardly toward said beam by reason of the leverage exerted by said bolts, their axes being disposed a considerable distance laterally of the outer edges of said cross beam 76. A considerable vertical clearance between each cap 78 and its companion bracket 70 is allowed, and as a consequence, the tolerance permissible in the vertical dimensions of the slots which receive the cross beam 76 may be very generous, inasmuch as each cap is forced downwardly by the clamping bolts 81 until the upper and lower faces of said cross beam 76 are firmly clamped. The tightening up of the clamping bolts 81 beyond this point then causes the ears 80—80 and 801—801 to swing inwardly toward the adjacent vertical transverse faces of the cross beam and firmly clamp these faces also. Thus, when the clamping operation has been finished, the outer ends of the cross beam 76 are as rigidly secured to the brackets 70 as if they were formed integrally therewith.

Up to the present time at least, the bulk of this general type of spring suspension has been supplied to trucks already manufactured, the truck having been originally a two-axle, light pay-load truck subsequently converted by the present invention into a three-axle, heavy payload truck of double or more its original capacity. Under such circumstances it is inevitable that there should be considerable variation in the actual dimensions of the various trucks manufactured by the various companies and also a considerable variation in the measurements taken from said trucks by more or less unskilled field operators.

For this reason it has been found advisable to provide a certain latitude in the installation of this cross beam 76 as regards its longitudinal positioning relative to the corresponding widths of the truck chassis. At the same time it has been found desirable to positively prevent longitudinal movement of each end of the cross beam 76 relatively to its bracket 70 and not to rely upon the frictional engagement of the cap 78 and its clamping bolts 81. The desired effect has been obtained by the use of a locating stud 82 provided with a square head 83 which is eccentric relatively to the shank of said stud. Said shank is snugly received within a suitable vertical hole drilled and reamed in its companion bracket 70, the square eccentric head of each locating stud being rotated to such a position as to properly register with the companion rectangular slot 84 formed in the companion lower outer end of the laminated cross beam 76. It is here being assumed that these slots 84 have been formed in the home factory and sent out to the assembling branches in the field where machine work is difficult, and, at the same time where accurate assembly is just as essential as work performed in the home factory.

Most trucks are subjected to terrific abuse in the hands of operators of low mentality. It has been found, because of this reason, that occasionally the crank shaft 63 will pass beyond its dead center position in the one direction due to the inertia and momentum forces involved. It has accordingly been found advisable to positively limit the rotation of said crank shaft in the one direction. It has at the same time, however, been found desirable to not suddenly stop the rotation of said crank shaft but to arrest its rotary movement sinusoidally.

Figure 1:
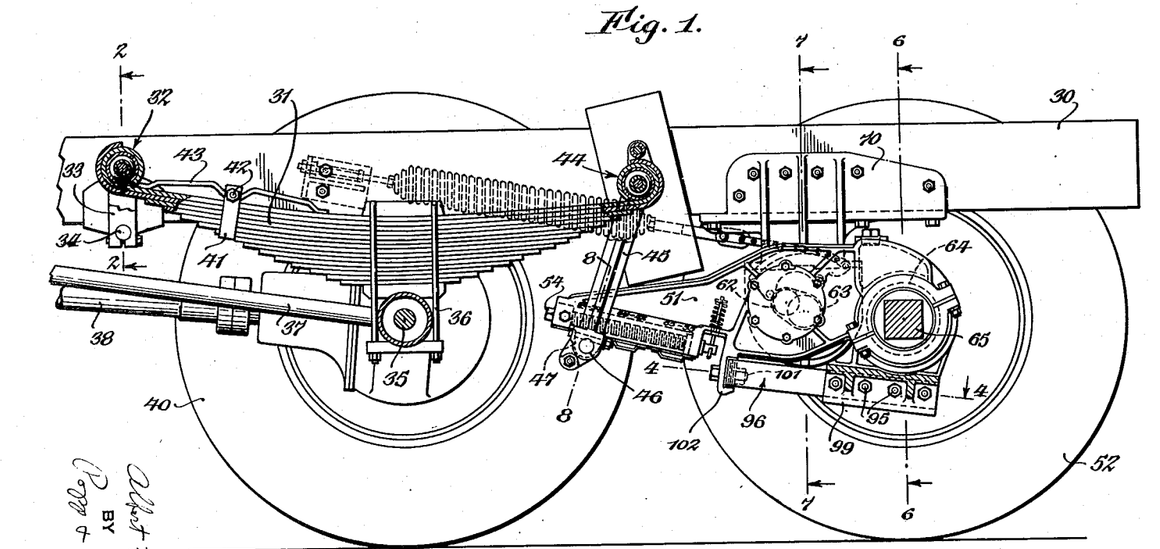
Figure 1 is a diminutive vertical, longitudinal section through the rear end of a truck or similar vehicle equipped with my improved spring suspension, taken on line 1—1 Fig. 3.
Figure 2:
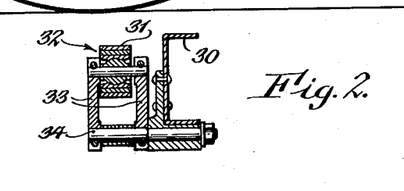
Figure 2 is a diminutive, fragmentary, vertical, transverse section thereof, taken on line 2—2 Fig. 1.
Figures 3, 4, 5:
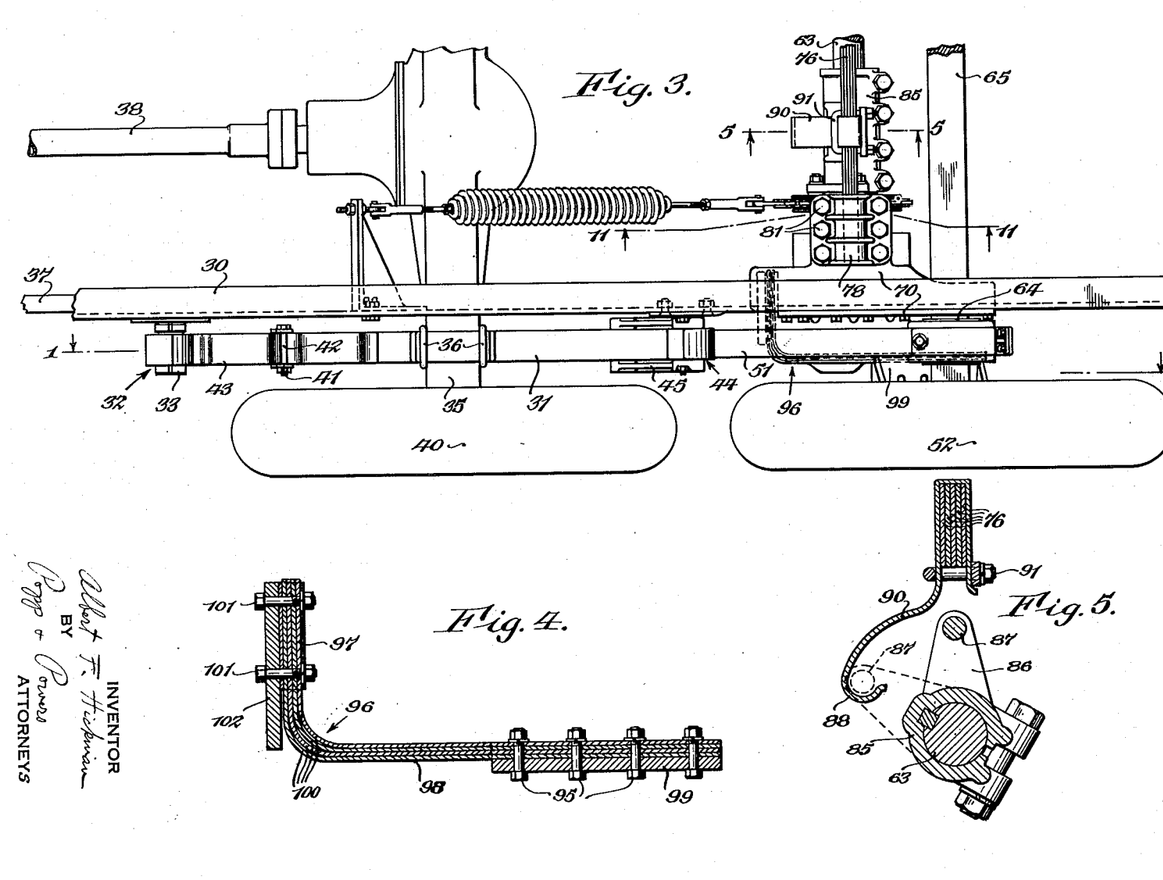
Figure 3 is a diminutive, fragmentary top plan of the rear left corner of a vehicle equipped with my improved spring suspension.
Figure 4 is a substantially horizontal section through the resilient torque arm, taken on line 4—4 Fig. 1.
Figure 5 is a vertical, longitudinal section through the crank shaft rotation-limiting device, taken on line 5—5 Fig. 3.

All of these factors have been taken care of as follows:

Formed integrally on the clamping collar 85, which clamps the two sections of the crank shaft 63 together, are a pair of laterally extending stop arms 86 connected at their outer ends by a horizontal transverse stop pin 87. This stop pin 87 is adapted to engage with the crooked end 88 of a resilient stop finger 90. This stop finger has its inner end curled around the central part of the cross beam 76 so as to embrace the same and is suitably clamped thereto by a clamping bolt 91. The portion of said stop finger intermediate of said cross beam 76 and the crooked end 88 of said stop finger is not straight but is of arcuate or curved form. Thus, when the stop pin 87 rotates a sufficient distance in a counter-clockwise direction, as seen in Fig. 5, and comes into contact with the inner face of the crooked end 88, the further movement of said stop pin is not immediately arrested. This is because of the shape of said stop finger 90, the curved intermediate portion thereof tending to straighten itself more and more as the pressure of the stop pin 87 is increased, until it finally becomes almost straight. Mathematically, it would require an infinite force to absolutely straighten said curved stop finger 90, and, consequently, the stopping of said stop pin may be said to be effected gradually and to never come to a dead, sudden stop. This action may, therefore, be denominated "non-bottoming", similar to the action of the crank shaft 63, as described in greater detail in my U. S. Patent No. 1,892,305 and 1,934,670.

Figure 6:
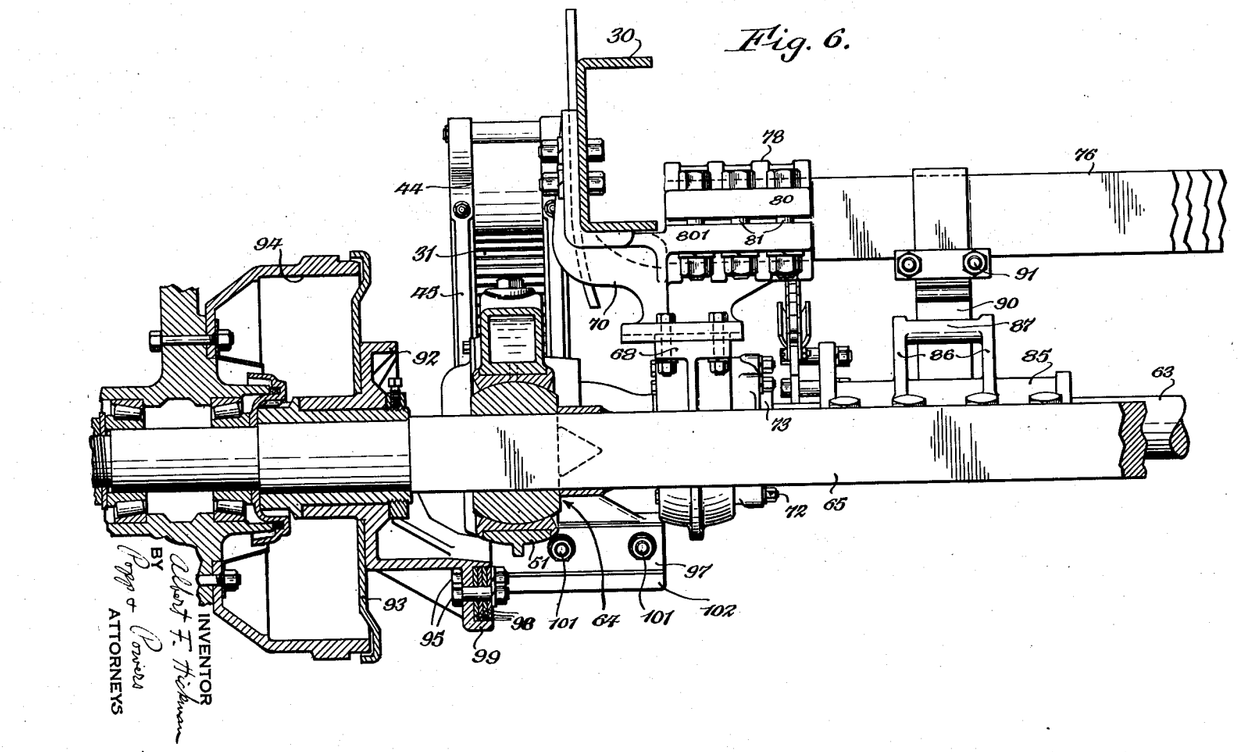
Figures 6 and 7 are fragmentary, vertical, transverse sections, taken on correspondingly numbered lines of Fig. 1.

The present invention provides an improved means of taking care of third-axle brake torque. Journaled upon each outer end of the third-axle is a torque sleeve 92 to which is suitably secured the usual backing plate 93. To this backing plate is secured, in the usual and well-known manner, the brake shoes (not shown) which are adapted to be engaged with the bore of the brake drum 94 in the usual and well-known manner. Hence, when the third-axle brakes are applied, a torque is imposed upon each backing plate 93. Secured by bolts 95, or otherwise, to a lower extension 99 of the torque sleeve 92 is a resilient, laminated, torque member 96. This torque member extends forwardly and substantially horizontally and is smoothly curved inwardly at 100 at its forward end to form a straight, front, torque arm 97 which is disposed at right angles to the straight, rear, torque arm 98. It will be noticed, in Fig. 4, that at the point where the laminations of this torque member are bent at right angles to each other to form the smooth, curved portions 100, said curved portions 100 are not in contact with each other. Said front torque arm 97 is secured by bolts 101 or otherwise to a suitable flange 102 depending integrally from the equalizing member 51. The action resulting from this construction is as follows:

If one end only of the third-axle rises, said resilient laminated torque member 96 is caused to be twisted and to this twisting offers only a relatively slight, resilient resistance by reason of the fact that each of the laminations of which it is composed is relatively thin and the twisting to which it is subjected is substantially perpendicular of its rear arm 98. At the same time, however, any tendency of the one backing plate 93 to rotate an appreciable distance relatively to its companion equalizing member 51 is very strongly and stiffly resisted by reason of the fact that such movement is in a vertical, longitudinal plane and hence parallel to the major axes of the laminations of the rear torque arm 98. It is to be noted that each backing plate 93 can rotate on the third-axle within the limits allowed by the resilient torque arm 96. Such a construction has been found necessary when (as in the construction of Figs. 1–12 under discussion) each end of said third-axle is provided with a backing plate and a companion resilient torque arm. The particular occasion for this construction arises when only the one end of the third-axle rises or falls relatively to the other end of said axle. In such case the one backing plate in question does not move appreciably relatively to its companion equalizing member 51, but both move considerably relatively to the adjacent portion of the third-axle. When one end only of the third-axle rises, a longitudinal movement of the one end or other of said third-axle relatively to its companion equalizing member occurs. This causes the rear torque arm 98 of the torque member 100 to be swung laterally a certain distance relatively to its front torque arm 97. To enable this swinging movement to be effected freely in either direction and without undue strains on any of the laminations of the torque member 96 is the reason why the laminations of said torque member are so formed as to be spaced apart from each other at the rounded corner 100.

Actual practice has demonstrated that only that spring suspension is satisfactory which permits one end only of an axle to rise or fall without causing any binding of the parts. This factor not only applies to the brake torque as just described, but to all the other parts of the spring suspension. For instance, when the drive axle 35 moves either up or down at its one end only, the front end of the main spring 31 tends to move inwardly toward the chassis frame. To prevent binding, it has been found desirable to permit of such inward movement, the same being accomplished in the present invention in the manner illustrated in Fig. 2. This shows that, when said drive axle 35 is parallel to the main chassis frame, the front end of the main spring 31 is in contact with the outer member of the shackle 33, but is spaced an appreciable distance outwardly from the outer face of the inner member of said shackle 33. Excessive lateral movement of any kind is, of course, to be avoided and hence when the drive axle is in its normal position it is preferable, as shown, to definitely locate said axle transversely of the vehicle by this contact between the outer face of said main spring 31 and the outer member of said shackle 33. At the same time, however, if only one end of the axle rises or falls, the main spring 31 is free to slide inwardly on the pivot pin 103.

*Light construction of Figs. 13–25*

In this form of the invention the most necessary characteristics of the previously described construction are employed but in a much more simple fashion so as to be commercially adapted to lighter weight trucks. In this case a Hotchkiss drive is disclosed, the front end of the main spring 311 being directly pivoted to its companion chassis frame bars 301 by a plain pivot 321. Such a construction, of course, eliminates the need of the radius rod 37 of Fig. 1.

Figures 13, 14, 15, 16, 17:
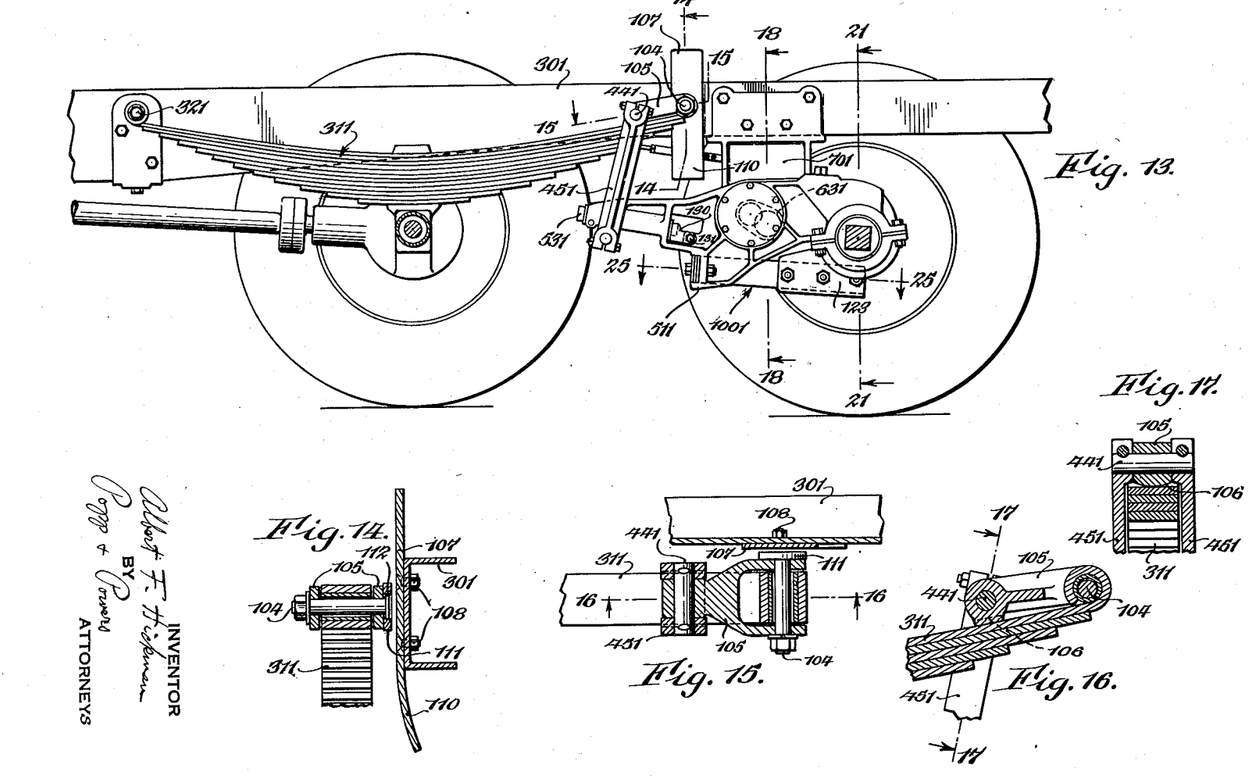
Figure 13 is a diminutive, vertical, longitudinal section through the rear end of a vehicle equipped with a modified form of my improved spring suspension.
Figure 14 is a fragmentary vertical section thereof, taken on line 14—14 Fig. 13.
Figure 15 is a fragmentary and substantially horizontal section through the parts associated with the rear end of the main spring of Fig. 13, and taken on line 15—15 Fig. 13.
Figure 16 is a fragmentary, vertical section through the rear end of the main spring of Fig. 13, taken on line 16—16 Fig. 15.
Figure 17 is a fragmentary, vertical section thereof, taken on line 17—17 Fig. 16.
Figures 18, 19, 20, 21:
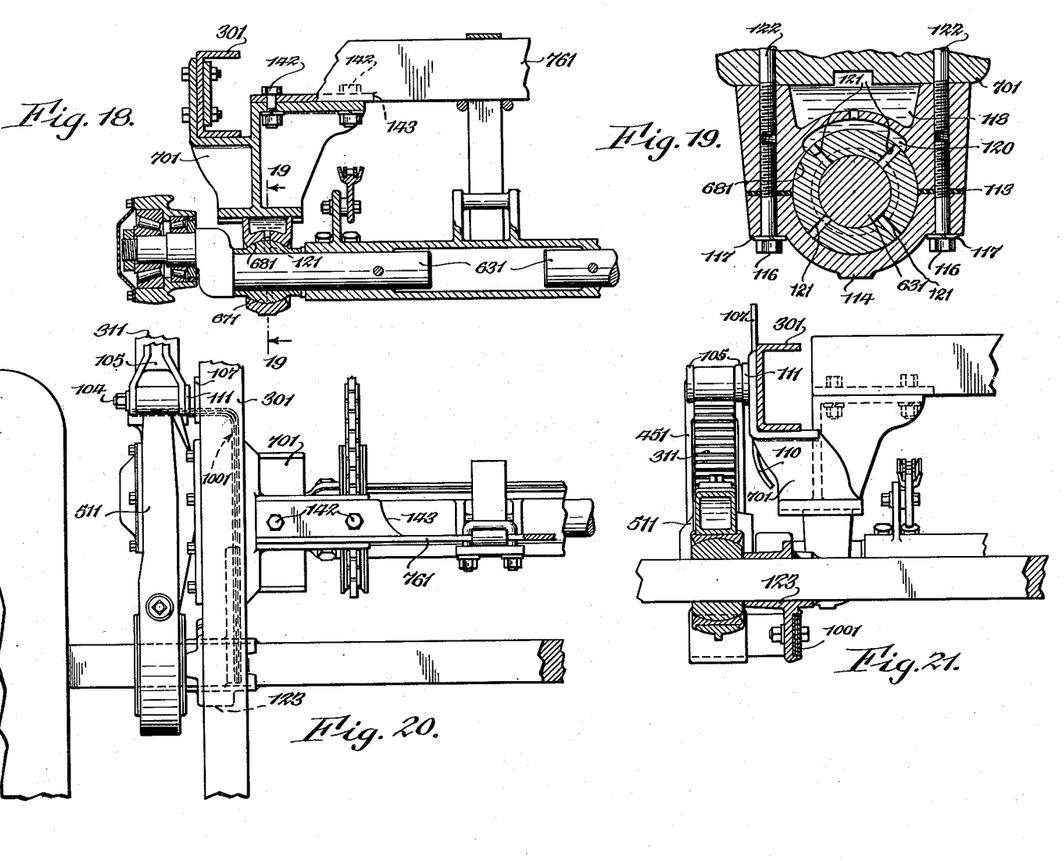
Figure 18 is a diminutive, fragmentary, vertical section through the modified spring suspension of Fig. 13, taken on line 18—18 Fig. 13.
Figure 19 is a fragmentary, vertical, longitudinal section, taken on line 19—19 Fig. 18.
Figure 20 is a diminutive, fragmentary, top plan of the type of spring suspension shown in Fig. 13.
Figure 21 is a diminutive, fragmentary, vertical, transverse section thereof, taken on line 21—21 Fig. 13.

This construction also discloses the means whereby the ordinary rear main springs of the original two-axle truck are employed, when the same is converted into a three-axle truck, by merely shortening the effective length of the regular main springs 311 so as to eliminate the necessity of entirely replacing the same by main springs especially constructed for the three-axle spring suspension. Extending longitudinally forward from the standard rear pivot 104 is a spacing link 105. The pivotal connection between the rear end of the spacing link 105 and the main spring 311 is preferably very loose, as shown in Figs. 14, 15, 16, so as to allow the front end of said spacing link to rock (and incidentally also twist) a small amount to the one or other side of the central position shown in the drawings. The front end of this spacing link 105 is pivoted at 441 to the upper end of a main shackle 451. The pressure imposed by said shackle 451 upon the main spring 311 is downward under practically all operating conditions. This downward thrust is carried by the front end of the spacing link 105, the lower face of said front end being suitably rounded at 106, as shown in Figs. 17 and 16, to freely permit the rocking action just described. This rounded construction permits of a non-friction or rolling action, enabling the lower end of the shackle 451 to swing laterally in one or other direction to a moderate but sufficient extent. This construction renders the connection between the shackle 451 and the main spring 311 substantially equivalent to the ball and socket joint 44 of Fig. 1, without requiring that a special main spring be constructed to obtain this ball-and-socket joint effect.

It has been found very desirable to permit of a moderate lateral movement of the rear ends of the main springs 31, 311 but at the same time to positively limit this lateral movement. This positive limitation is effected by a guide plate 107 which is secured to its companion chassis frame bar 301 by carriage bolts 108 or the like, and suitably curved inwardly at its lower end at 110 so as to absolutely insure that the rear end of the main spring will not become jammed against the lower edge of said guide plate 107. Heretofore, the pivot pin 104 has been so constructed as to have its head in direct contact with said guide plate 107. This, however, involves an unnecessarily high replacement cost when the head only of the pivot pin becomes unduly worn, especially if said pivot pin be constructed of sufficiently high carbon steel to enable its head to be tempered. The present construction eliminates this difficulty by providing a hardened and ground button 111 which takes all of the wear involved in the lateral movement of the rear ends of the main springs. This button is suitably counterbored and rabbeted to receive the small annular head 112 of the pivot bolt 104. When this button becomes unduly worn after prolonged service of the vehicle, it may be inexpensively replaced without requiring replacement of the pivot bolt 104.

In this form of the invention (Figs. 13–25) the roller bearings 66 of Fig. 7 have been eliminated and an ordinary straight bearing substituted. Such a straight bearing is, of course, liable to seize more or less and to then cause more or less of the entire movement of the crank shaft 631 relatively to the bracket 701 to be imposed upon the spherical bearing 681. Such a possibility is absolutely eliminated in the present invention by effecting a heavy frictional resistance between the spherical bearing head 671 and its spherical bearing 681, thereby permitting this spherical bearing to come into play only when the crank shaft moves in some plane which is coincident with its normal axis. In other words, this heavy friction on the spherical bearing 681 causes the cylindrical pivotal connection between the crank shaft 631 and the spherical bearing head 671 to take care of all the ordinary (rotative) movements of the crank shaft 631. This effect is accomplished by interposing a resilient gasket 113 between the spherical bearing cap 114 and the spherical bearing 681 and clamping said cap and bearing together by a suitable pair of cap screws 116. Interposed between each cap screw 116 and said spherical bearing cap 114 is a conventional lock washer 117. This lock washer, however, is not used solely as a lock washer but has the specific function of resiliently urging the spherical bearing cap 114 toward the spherical bearing 681 and compressing the resilient gasket 113 therebetween. This gasket is constructed of rubber or like material, its primary function being to permit the lock washers 117 to at all times resiliently urge the spherical bearing cap 114 upwardly and, at the same time, to prevent any oil leakage from the spherical bearing and to exclude dirt therefrom. This spherical bearing receives its lubricant from a suitable reservoir 118 formed in the spherical bearing 681, the oil being fed to an arcuate groove 120 formed in the bore of said spherical bearing 681. The plain cylindrical bearing between the crank shaft 631 and the spherical bearing head 671 is also lubricated from this same source, said spherical bearing head 671 being radially drilled at two places at 121 so as to enable lubricating oil to flow from the arcuate groove 120 therethrough and to said plain cylindrical bearing, even though the spherical bearing head 671 should become displaced rotatably a considerable distance in the one or other direction from the position shown in the drawings. It is to be noted that, while the spherical bearing cap 114 is at all times resiliently urged toward the spherical bearing 681, the connection between said bearing 681 and its companion bracket 701 is absolutely rigid due to the cap screws 116. By reason of this resilient connection between the spherical bearing 681 and its cap 114, it has been found unnecessary to grind or to otherwise accurately machine the spherical surfaces of either the spherical bearing head 671 or its companion spherical bearing 681 and cap 114. Actual experience has demonstrated that such a spherical bearing laps itself perfectly during the first thousand miles of vehicle travel. In other words the truck laps in its spherical bearings after all the parts are assembled and as a consequence of actual service, thereby not only rendering the lapping extremely accurate and fluid tight, but also eliminating the otherwise high cost of accurately machining the spherical bearing parts.

In relatively light vehicles, such as one and one-half ton trucks (Figs. 13-25) it has been found entirely feasible to take care of the third-axle brake torque sleeves 92 of Fig. 6 and enabling the third-axle backing plates to be directly secured to said third-axle and requiring only the one resilient torque member 1001. In this case the front arm of said L shaped resilient torque arm 1001 is secured, as before, to the equalizing member 511, while the rear arm of said resilient torque arm is secured to a sleeve 123 welded or otherwise rigidly secured to the third axle. Such a construction is entirely practical and very inexpensive to manufacture, but is not suitable for heavy vehicles.

Figure 22:
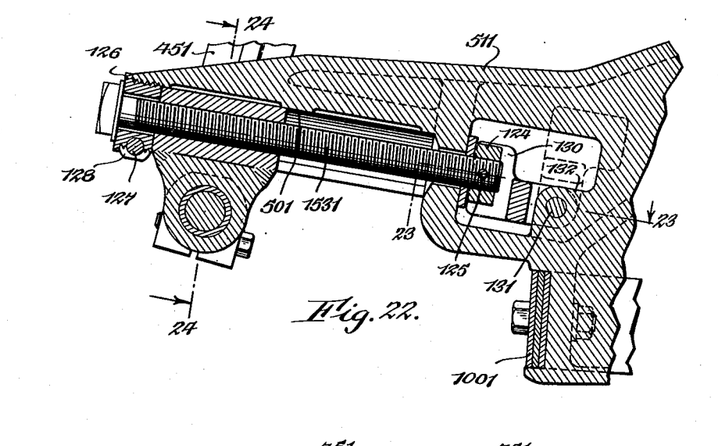
Figure 22 is a fragmentary, vertical, longitudinal section similar to Fig. 9 but taken through the front end of the modified walking beam of Fig. 13.
Figure 23:
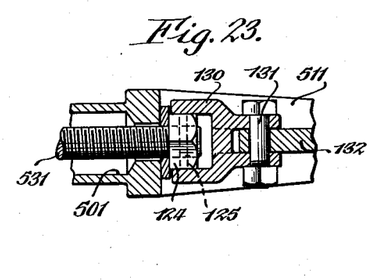
Figure 23 is a fragmentary and substantially horizontal section thereof, taken on line 23—23 Fig. 22.
Figure 24:
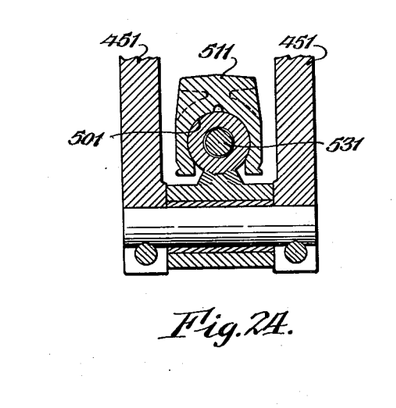
Figure 24 is a fragmentary and substantially vertical section thereof, taken on line 24—24 Fig. 22.
Figure 25:
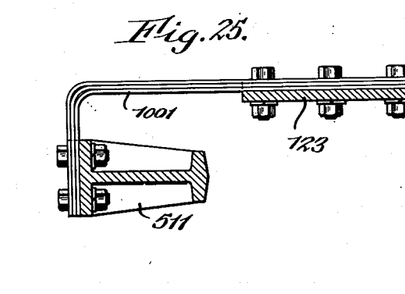
Figure 25 is a fragmentary and substantially horizontal section through the modified, resilient torque arm of Fig. 13, taken on line 25—25 of said Fig. 13.

Figures 22, 23 and 24 illustrate a modified means of effecting traction adjustment and of preventing accidental change of adjustment after the same has been made. In this case the adjusting screw 531 is constructed from an ordinary standard bolt which is prevented from moving longitudinally in the equalizing member 511 by reason of its head at its one end and its nut 124 at its other end, the latter secured permanently in place by a suitable pin 125. Rotation of said traction-adjusting screw 531 is effected by applying a wrench to its head at its front end. To enable the parts to be assembled, the bore 501 extends clear to the front end of the equalizing member 511 and a threaded bushing 126 screwed into the forward end of said assembled bore 501. After said threaded bushing 126 has been screwed firmly into place, it is clamped by a clamping bolt 127 which compresses together the two clamping ears 128 which are suitably formed at the extreme front end of the equalizing member 511.

This construction also includes a modified means of preventing accidental rotation of the traction-adjusting screw 531. This is effected by a bifurcated locking dog 130 which is horizontally and transversely pivoted at 131 to a suitable, vertical, longitudinal projection 132 formed integrally on the equalizing member 511. When it is desired to turn the traction-adjusting screw 531, this bifurcated locking dog 130 is pushed up and back into the dotted line position of Fig. 22, and said traction adjusting screw is then rotated to the desired position. Thereupon said bifurcated locking dog 130 is returned to the full line position of Figs. 13, 22, 23 in which position it embraces the flat, side faces of the nut 124 of said traction-adjusting screw.

In this light vehicle construction, a modified form of cross beam 761 has been found satisfactory and very inexpensive. In this case the same cross beam is constructed of an ordinary angle iron secured at its opposite ends by bolts 142 to the brackets 701. The horizontal flange of said angle iron cross beam 761 extends, however, only a short distance inwardly of each bracket 701, being cut away at 143. Thus the entire central portion of the cross beam 761 intermediate of the bracket 701 consists solely of a bar of metal of rectangular section having its major axis vertical and of considerable size, while its minor axis is disposed horizontally and longitudinally of the vehicle and is relatively small. Thus said cross beam 761 is capable of being quite easily twisted or bent in a horizontal plane but vigorously resists any stress tending to bend it in a plane which is vertical and transverse of the vehicle.

Modified forms of cross beams

Figures 26, 27, 28:
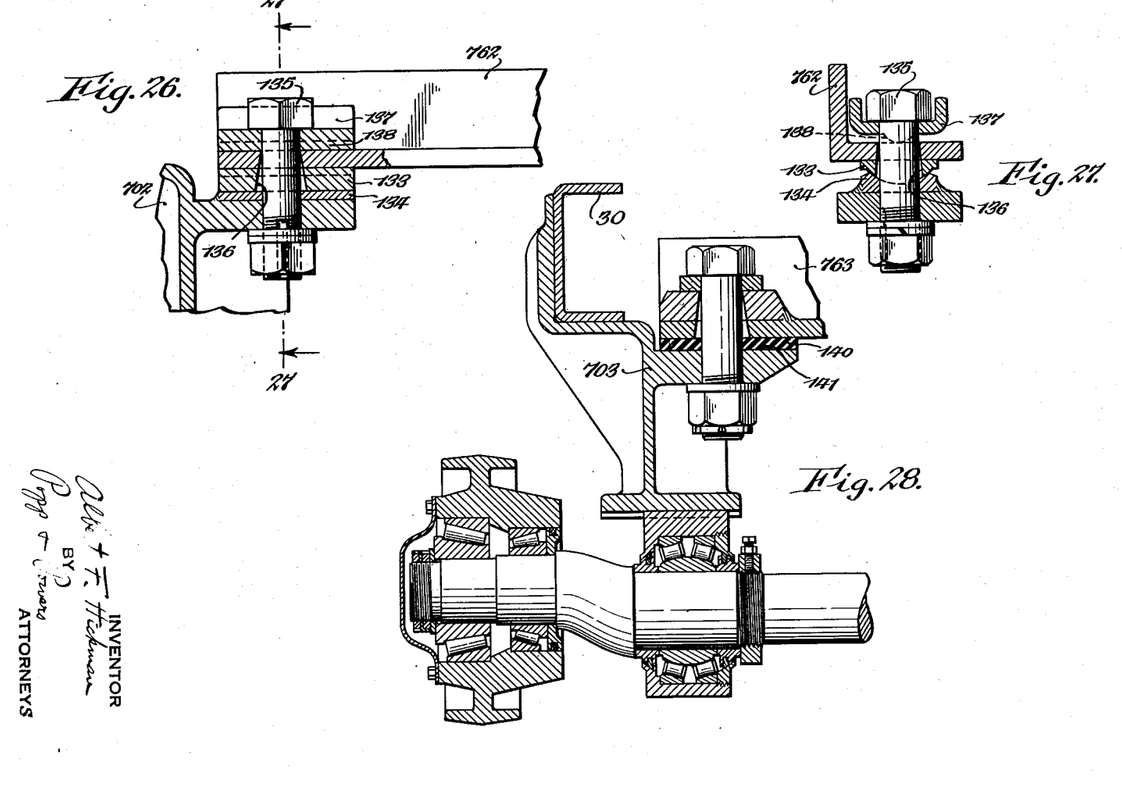
Figure 26 is a fragmentary, vertical, transverse section through a vehicle, showing a modified means of permitting weaving of the main frame without permitting the crank shaft bearings to move toward or from each other.
Figure 27 is a fragmentary, vertical, longitudinal section thereof, taken on line 27—27 Fig. 26.
Figure 28 is a fragmentary, vertical, transverse section showing another modified means of preventing frame distortion from disturbing the spacing of the crank shaft bearings.

Figs. 26 and 27 show a modified means of permitting weaving of the main frame of the vehicle without allowing the crank shaft bearings to move toward and from each other. In this construction the cross beam 762 is stiff and, in the form illustrated, consists of a heavy angle iron extending from one side of the truck chassis to the other. Welded or otherwise secured to the lower face of each end of said cross beam is a rocking head 133 having its lower face of semi-cylindrical form, the axis of which is horizontal and transverse of the vehicle. To the bracket 702 of the vehicle is secured at its inner end an upwardly facing semi-cylindrical rocking cradle 134, the semi-cylindrical face of which is adapted to engage with a downwardly facing semi-cylindrical face of the rocking head 133. Said cross beam 762 is held down at each end in contact with said rocking cradle 134 by means of a bolt 135. To permit said cross beam 762 to freely rock on an axis which is horizontal and transverse of the vehicle, said rocking head 133 is taper-bored at 136 while the upper end of the bolt 135, instead of resting directly upon the cross beam 762, rests upon a rocking seat 137, the lower face of which is provided with a semi-cylindrical face 138, the axis of which is horizontal and transverse of the vehicle. By this construction the main frame of the vehicle may twist and warp in any direction except in a vertical transverse plane. In other words, the bearings interposed between the brackets 702 and the crank shaft are kept at a constant distance from each other irrespective of whatever other movements the chassis frame bars, together with their brackets 702, may have relatively to each other.

Figure 28 shows a modified cross beam 763. In this case a resilient pad 140 is interposed between the lower face of each end of the cross beam 763 and the adjacent upper horizontal face 141 of the bracket 703. This construction is not considered as satisfactory as those previously described, but has been found to effect the desired result in vehicles of light construction. The reason why this particular construction does actually obtain the desired result is due to the fact that the stresses imposed upon the main frame of the vehicle, when the latter is twisted, are so very great as to easily compress the resilient pad 140, whereas the forces tending to rotate brackets 703 in a plane which is vertical transverse of the vehicle are so small as to not appreciably compress said resilient pad due to the small lever arm involved. In addition to this said resilient pad is very narrow in the horizontal direction longitudinally of the vehicle, while it is relatively wide in the horizontal direction transversely of the vehicle.

I claim as my invention:—

1. A vehicle spring suspension comprising: a pair of longitudinal chassis frame bars; a bracket secured to one of said frame bars; an axle; a wheel journaled on said axle; means movably connecting said axle to said bracket; and a cross beam connecting said frame bars and adapted to resist all forces applied in a vertical, transverse (transverse of the vehicle) plane but to be otherwise flexible.

2. A vehicle spring suspension comprising: a pair of longitudinal chassis frame bars; a bracket secured to one of said frame bars; an axle; a wheel journaled on said axle; means movably connecting said axle to said bracket; a cross beam having a locating notch; a locating stud having an eccentric head engaged in said notch; and means connecting said stud with said bracket.

3. A vehicle spring suspension comprising: a pair of longitudinal chassis frame bars; a bracket secured to one of said frame bars; an axle; a wheel journaled on said axle; means movably connecting said axle to said bracket; and a laminated cross beam connecting said frame bars, the laminations of said cross beam being connected together only at their ends.

4. A vehicle spring suspension comprising: a pair of longitudinal chassis frame bars; a bracket secured to one of said frame bars; an axle; a wheel journaled on said axle; means movably connecting said axle to said bracket; a cross beam; a clamp connected to each end of said cross beam; and means connecting each clamp with the adjacent frame bar.

5. A vehicle spring suspension comprising: a pair of longitudinal chassis frame bars; a bracket secured to one of said frame bars; an axle; a wheel journaled on said axle; means movably connecting said axle to said bracket; a cross beam; a clamp connected to each end of said cross beam and having a laterally projecting pinching ear; means for forcing said pinching ear in a direction parallel to the adjacent face of said beam; and means connecting each clamp with the adjacent frame bar.

6. A vehicle spring suspension comprising: a pair of longitudinal chassis frame bars; a bracket secured to one of said frame bars; an axle having a wheel journaled thereon; means movably connecting said axle with said bracket; a cross beam having a locating notch at one end; means connecting the other end of said cross beam with the other frame bar; a locating stud having a head engaged in said notch; and means connecting said stud with said bracket.

7. A vehicle spring suspension comprising: a pair of chassis frame bars; bearings disposed on an axis which is horizontal and transverse of the vehicle; means connecting each of said bearings with a companion chassis frame bar; a cross beam journaled in said bearings; brackets connected with said frame bars; spindles having wheels journaled thereon; a cross shaft journaled in said brackets; and means connecting each of said spindles with said cross shaft.

ALBERT F. HICKMAN.